(12) United States Patent
Kataoka et al.

(10) Patent No.: US 9,990,549 B2
(45) Date of Patent: Jun. 5, 2018

(54) COMPLEX MARKING DETERMINING DEVICE AND COMPLEX MARKING DETERMINING METHOD

(71) Applicants: TOYOTA JIDOSHA KABUSHIKI KAISHA, Toyota-shi, Aichi-ken (JP); DENSO CORPORATION, Kariya-shi, Aichi-ken (JP)

(72) Inventors: Yusuke Kataoka, Susono (JP); Naoki Kawasaki, Kariya (JP); Tadashi Sakai, Kariya (JP); Akihiro Watanabe, Nagoya (JP)

(73) Assignees: TOYOTA JIDOSHA KABUSHIKI KAISHA, Toyota-shi, Aichi-ken (JP); DENSO CORPORATION, Kariya-shi, Aichi-ken (JP)

(*) Notice: Subject to any disclaimer, the term of this patent is extended or adjusted under 35 U.S.C. 154(b) by 204 days.

(21) Appl. No.: 14/994,421

(22) Filed: Jan. 13, 2016

(65) Prior Publication Data
US 2016/0210519 A1    Jul. 21, 2016

(30) Foreign Application Priority Data
Jan. 15, 2015    (JP) .................... 2015-006155

(51) Int. Cl.
*G06T 7/73* (2017.01)
*G06T 7/13* (2017.01)
(Continued)

(52) U.S. Cl.
CPC ............ *G06K 9/00798* (2013.01); *B60R 1/00* (2013.01); *G06K 9/4604* (2013.01);
(Continued)

(58) Field of Classification Search
None
See application file for complete search history.

(56) References Cited

U.S. PATENT DOCUMENTS 4,970,653 A * 11/1990 Kenue ............... G05D 1/0246
348/116
5,790,403 A    8/1998 Nakayama
(Continued)

FOREIGN PATENT DOCUMENTS

EP    2871629 A1    5/2015
JP    H08-005388 A    1/1996
(Continued)

OTHER PUBLICATIONS

Communication dated May 31, 2016 from the European Patent Office in counterpart Application No. 16151566.3.
(Continued)

*Primary Examiner* — Reza Aghevli
(74) *Attorney, Agent, or Firm* — Sughrue Mion, PLLC

(57) ABSTRACT

A complex marking determining device includes a brightness state calculating portion configured to calculate a lane marking representative value indicative of a brightness state of a plurality of pixels that make up a lane marking display region, and calculate a road surface representative value indicative of a brightness state of a plurality of pixels that make up the road surface display region; and a complex marking determining portion configured to determine that the lane marking is a complex marking at least when a degree of deviation between the lane marking representative value and the road surface representative value is equal to or greater than a first threshold value.

6 Claims, 11 Drawing Sheets

(51) Int. Cl.
  *G06K 9/52*   (2006.01)
  *G06K 9/00*   (2006.01)
  *B60R 1/00*   (2006.01)
  *G06K 9/46*   (2006.01)
  *G06K 9/62*   (2006.01)

(52) U.S. Cl.
  CPC ............ *G06K 9/4661* (2013.01); *G06K 9/52* (2013.01); *G06K 9/6215* (2013.01); *G06T 7/13* (2017.01); *G06T 7/73* (2017.01); *G06K 2009/4666* (2013.01); *G06T 2207/30256* (2013.01)

(56) References Cited

U.S. PATENT DOCUMENTS

| | | | |
|---|---|---|---|
| 6,591,000 B1 | 7/2003 | Oike et al. | |
| 6,850,628 B2 | 2/2005 | Shirato | |
| 9,467,687 B2* | 10/2016 | Takemura | H04N 17/002 |
| 2009/0296987 A1 | 12/2009 | Kageyama et al. | |
| 2010/0189306 A1* | 7/2010 | Kageyama | G06K 9/00798 382/104 |
| 2010/0316255 A1* | 12/2010 | Mathony | B60W 50/14 382/103 |
| 2012/0057757 A1* | 3/2012 | Oyama | G06K 9/00798 382/104 |
| 2012/0072080 A1* | 3/2012 | Jeromin | B60Q 1/143 701/49 |
| 2013/0272577 A1* | 10/2013 | Sakamoto | G08G 1/167 382/103 |
| 2015/0227799 A1 | 8/2015 | Kataoka | |
| 2015/0248771 A1* | 9/2015 | Kim | G06T 7/0083 382/169 |
| 2015/0248837 A1* | 9/2015 | Kim | G08G 1/167 348/148 |
| 2016/0012300 A1* | 1/2016 | Tsuruta | G06K 9/00798 382/104 |
| 2016/0162741 A1* | 6/2016 | Shin | G06K 9/00791 382/104 |

FOREIGN PATENT DOCUMENTS

| | | |
|---|---|---|
| JP | H08-087700 A | 4/1996 |
| JP | 2005-141487 A | 6/2005 |
| JP | 2007-072512 A | 3/2007 |
| JP | 2007-141052 A | 6/2007 |
| JP | 2007-179386 A | 7/2007 |
| JP | 2007-235414 A | 9/2007 |
| JP | 2015-149029 A | 8/2015 |
| WO | 2013133086 A1 | 9/2013 |
| WO | WO 2013/133086 * 9/2013 | ............ G06K 9/00 |
| WO | 2014007175 A1 | 1/2014 |

OTHER PUBLICATIONS

An Office Action dated Sep. 2, 2011, which issued during the prosecution of U.S. Appl. No. 12/472,421.

* cited by examiner

COMPLEX MARKING DETERMINING DEVICE AND COMPLEX MARKING DETERMINING METHOD

INCORPORATION BY REFERENCE

The disclosure of Japanese Patent Application No. 2015-006155 filed on Jan. 15, 2015 including the specification, drawings and abstract is incorporated herein by reference in its entirety.

BACKGROUND OF THE INVENTION

1. Field of the Invention

The invention relates to a complex marking determining device and a complex marking determining method that determines whether a lane marking of a road on which a vehicle is traveling is a complex marking.

2. Description of Related Art

As technology for determining whether a lane marking of a road on which a vehicle is traveling is a complex marking, technology is known that determines the type of boundary marking of a road on which a vehicle is traveling (hereinafter, also referred to simply as "traveling road") based on an image of the traveling road, as described in Japanese Patent Application Publication No. 2005-141487 (JP 2005-141487 A). This determination technology attempts to reliably recognize a boundary marking of the traveling road by setting a horizontal lane searching line on the image, detecting potential lane points using this lane searching line, and the determining the type of boundary marking of the lane according to the densities and shapes of these potential lane points.

With the determination technology described above, in a situation in which the resolution of a camera capturing the image is low, such as with a distant area of the traveling road or the like, the detection accuracy of the potential lane points decreases, which makes it difficult to accurately identify the number of potential points. Therefore, there may be cases in which it is not possible to determine whether a lane marking of a lane is a complex marking or a single marking.

SUMMARY OF THE INVENTION

The invention thus provides a complex marking determining device and a complex marking determining method capable of determining whether a lane marking of a road on which a vehicle is traveling is a complex marking, regardless of the detection accuracy of potential lane points.

A first aspect of the invention relates to a complex marking determining device that includes an imaging portion that captures an image of a traveling road of a vehicle, and obtains a traveling road image; a region setting portion configured to set a lane marking display region in a position where a lane marking is displayed, in the traveling road image obtained by the imaging portion, and set a road surface display region in a position that is closer to a center of the traveling road than the lane marking display region, and where a road surface other than the lane marking is displayed, in the traveling road image; a brightness state calculating portion configured to calculate a lane marking representative value indicative of a brightness state of a plurality of pixels that make up the lane marking display region, and calculate a road surface representative value indicative of a brightness state of a plurality of pixels that make up the road surface display region; and a complex marking determining portion configured to determine that the lane marking is a complex lane marking at least when a degree of deviation between the lane marking representative value and the road surface representative value is equal to or greater than a first threshold value.

According to this aspect, it is possible to determine whether a lane marking is a complex marking, even if the position of the lane marking is not able to be accurately detected, by determining that the lane marking is a complex marking when the degree of deviation between the lane marking representative value indicative of the brightness state of the lane marking display region and the road surface representative value indicative of the brightness state of the road surface display region is equal to or greater than the preset threshold. Therefore, it is possible to determine whether the lane marking of the traveling road is a complex marking, regardless of the potential lane point detection accuracy.

In the aspect above, the complex marking determining device may also include an edge detecting portion that detects a number of edge points in the lane marking display region. Also, the complex lane marking determining portion may be configured to determine that the lane marking is a complex marking when the degree of deviation is equal to or greater than the first threshold value, and the number of edge points is equal to or greater than a second threshold value.

In this case, an erroneous determination that a thick single marking is a complex marking is able to be inhibited.

Also, in the aspect described above, the brightness state calculating portion may be configured to calculate, as the lane marking representative value, a median value of brightness values of the plurality pixels that make up the lane marking display region, and calculate, as the road surface representative value, a median value of brightness values of the plurality of pixels that make up the road surface display region.

According to this aspect, the lane marking representative value and the road surface representative value are able to be calculated by a simple calculation process, by calculating the median value of the brightness values of the plurality of pixels that make up the lane marking display region as the lane marking representative value, and calculating the median value of the brightness values of the plurality of pixels that make up the road surface display region as the road surface representative value. Therefore, the complex marking determination is able to be performed quickly.

Also, in the complex marking determining device described above, the brightness state calculating portion may be configured to calculate, as the lane marking representative value, an average value of brightness values of the plurality pixels that make up the lane marking display region, and calculate, as the road surface representative value, an average value of brightness values of the plurality of pixels that make up the road surface display region.

According to this aspect, the lane marking representative value and the road surface representative value are able to be calculated by a simple calculation process, by calculating the average value of the brightness values of the plurality of pixels that make up the lane marking display region as the lane marking representative value, and calculating the average value of the brightness values of the plurality of pixels that make up the road surface display region as the road surface representative value. Therefore, the complex marking determination is able to be performed quickly.

In the aspect described above, the degree of deviation may be a difference between the lane marking representative value and the road surface representative value.

In the aspect described above, the degree of deviation may be a ratio of the lane marking representative value and the road surface representative value.

Also, a second aspect of the invention relates to a complex marking determining method that includes capturing an image of a traveling road of a vehicle, and obtaining a traveling road image; setting a lane marking display region in a position where a lane marking is displayed, in the traveling road image, and setting a road surface display region in a position that is closer to a center of the traveling road than the lane marking display region, and where a road surface other than the lane marking is displayed, in the traveling road image; calculating a lane marking representative value indicative of a brightness state of a plurality of pixels that make up the lane marking display region, and calculating a road surface representative value indicative of a brightness state of a plurality of pixels that make up the road surface display region; and determining that the lane marking is a complex marking when a degree of deviation between the lane marking representative value and the road surface representative value is equal to or greater than a preset threshold value.

According to this aspect, it is possible to determine whether a lane marking is a complex marking, even if the position of the lane marking is not able to be accurately detected, by determining that the lane marking is a complex marking when the degree of deviation between the lane marking representative value indicative of the brightness state of the lane marking display region and the road surface representative value indicative of the brightness state of the road surface display region is equal to or greater than the preset threshold. Therefore, it is possible to determine whether the lane marking of the traveling road is a complex marking, regardless of the potential lane point detection accuracy.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
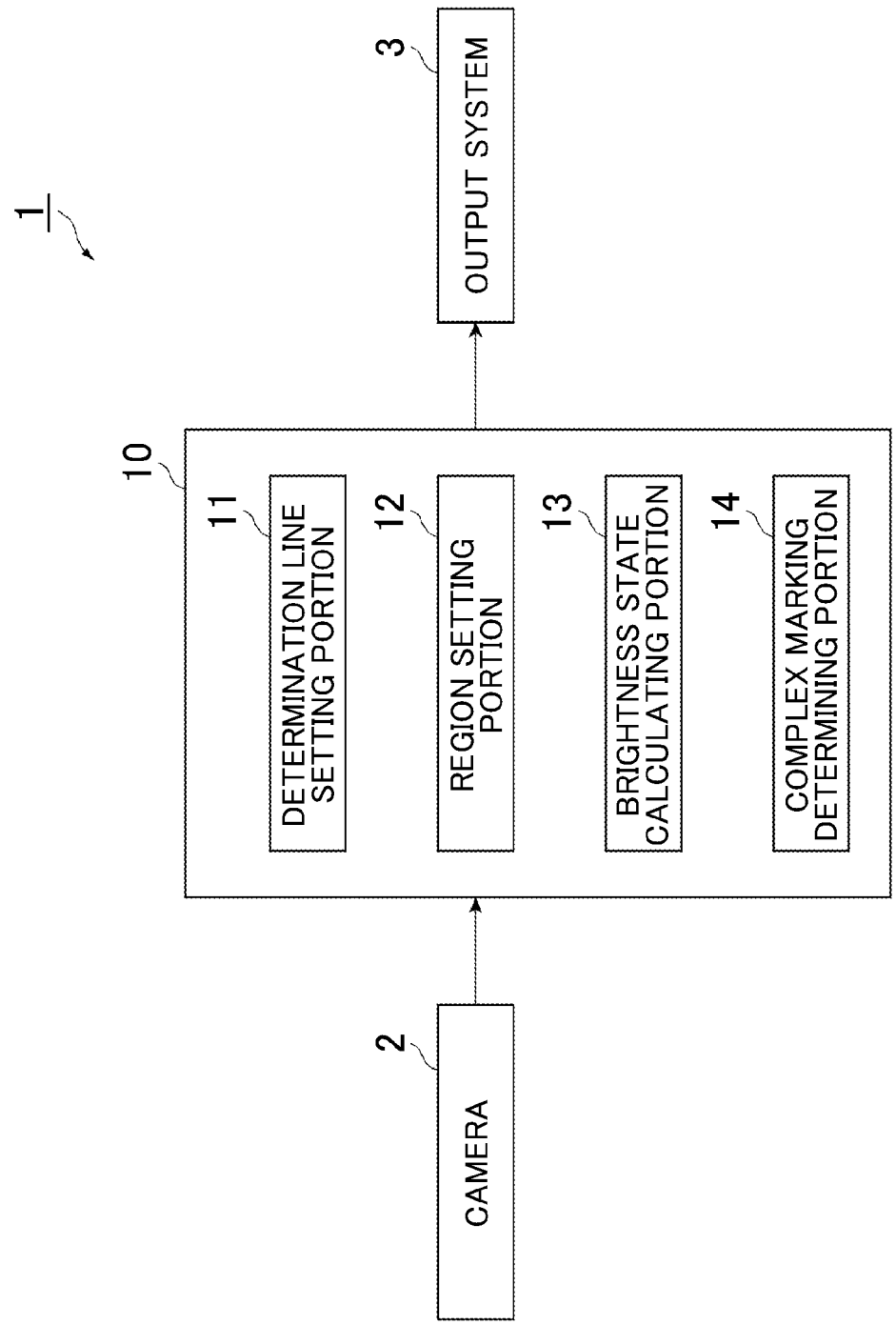
FIG. 1 is a general diagram of the structure of a complex marking determining device according to a first example embodiment of the invention.

Hereinafter, example embodiments of the invention will be described with reference to the accompanying drawings. In the drawings, like elements will be denoted by like reference characters, and redundant descriptions will be omitted.

Figure 2:
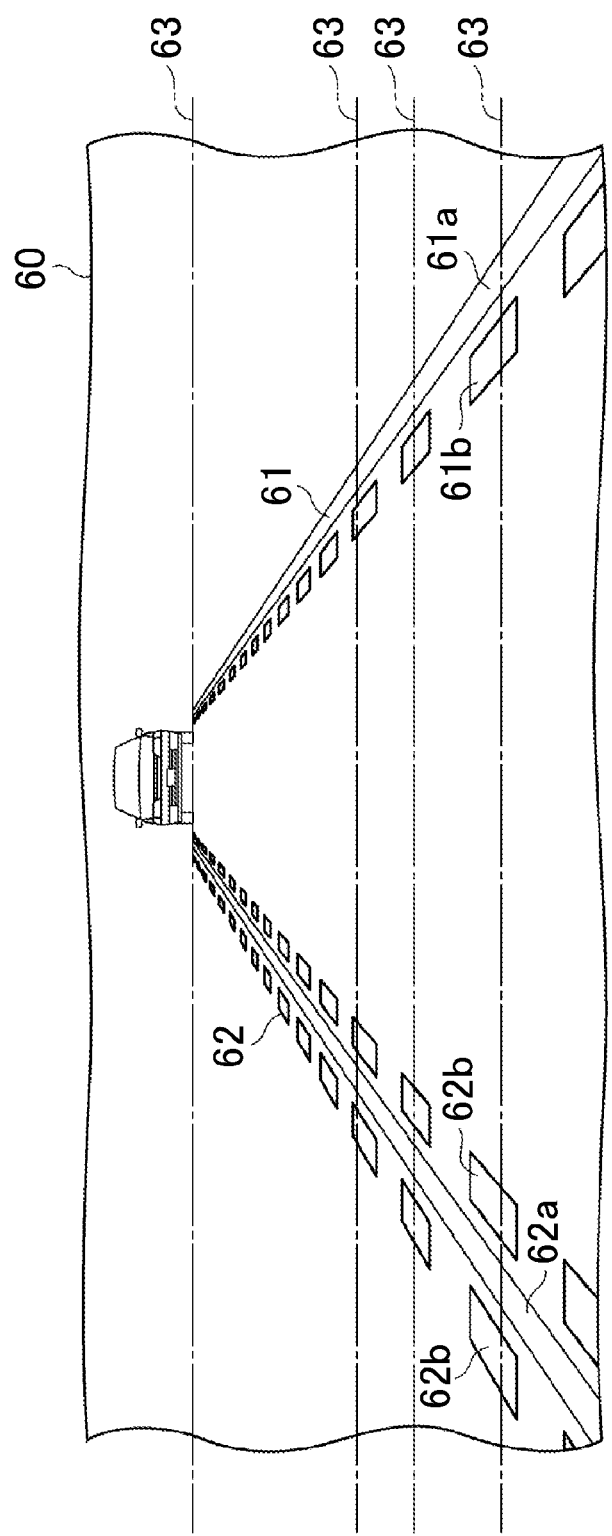
FIG. 2 is an explanatory view of a traveling road image used by the complex marking determining device in FIG. 1.

FIG. 1 is a general diagram of the structure of a complex marking determining device 1 according to a first example embodiment of the invention. FIG. 2 is an explanatory view of a traveling road image used for the complex marking determination by the complex marking determining device 1.

As shown in FIG. 1, the complex marking determining device 1 is a device that determines whether a lane marking of a traveling lane of a vehicle is a complex marking using a traveling road image captured by a camera 2 mounted on the vehicle. A lane marking of the traveling road is a marking (i.e., a line) that is marked on a road surface of the traveling road and divides lanes, and is referred to as a white line or a lane marker. The lane marking includes a road center line, a lane boundary line, and road outside edge line, and the like. A road center line is a line that divides a plurality of lanes in opposite traveling directions, and is referred to as a center line. A lane boundary line is a line that indicates a boundary between adjacent lanes in the same traveling direction. A road outside edge line is a line drawn on an edge of the traveling road. A complex marking is a marking that is formed by a plurality of lines, and is any lane marking other than a single lane marking.

The complex marking determining device 1 is formed by an ECU (Electronic Control Unit) 10, for example, and includes a determination line setting portion 11, a region setting portion 12, a brightness state calculating portion 13, and a complex marking determining portion 14. The ECU 10 is an electronic control unit that performs a complex marking determining routine, and mainly includes a computer that has a CPU, ROM, and RAM, for example. The ECU 10 may form only the complex marking determining device 1, may have a function aside from that of the complex marking determining device 1, or may also function as another device. The determination line setting portion 11, the region setting portion 12, the brightness state calculating portion 13, and the complex marking determining portion 14 are formed by installing software or a program that realizes the respective functions in the ECU 10, for example. Also, a portion or all of the determination line setting portion 11, the region setting portion 12, the brightness state calculating portion 13, and the complex marking determining portion 14 may be formed by separate electronic control units.

The camera 2 and an output system 3 are connected to the complex marking determining device 1. The camera 2 functions as an imaging portion that captures an image of an area around the vehicle, and is mounted so as to be able to capture an image of the area in front of the vehicle in the direction in which the vehicle travels, for example. The camera 2 inputs image information of the traveling road image that captures the traveling road into the ECU 10. Any camera may be used for the camera 2, as long as it is able to obtain brightness information or brightness values of pixels that make up the image. For example, the image captured by the camera 2 may be color or monochrome, and the image waveband of the camera 2 may be visible wavelengths or a near-infrared wavelength.

The output system 3 is a unit that controls the vehicle using information indicative of whether the lane marking of the traveling road is a complex marking. A lane trace control system or a lane departure control system or the like, for example, correspond to the output system 3.

The determination line setting portion 11 sets a determination line on the traveling road image that captures the traveling road. The determination line is a line to indicate a region or position for determining whether a lane marking of the traveling road is a complex marking.

For example, as shown in FIG. 2, a lane marking 61 on a right side of a lane and a lane marking 62 on the left side of the lane are shown in a traveling road image 60 that captures the traveling road. The lane markings 61 and 62 are shown extending upward toward the center of the traveling road image 60 as they become farther away. Here, the lane marking 61 is a complex marking, and shows a broken additional line 61*b* to the inside of a solid line 61*a*. Also, the lane marking 62 is also a complex marking, and shows broken an additional line 62*b* on both the inside and the outside of a solid line 62*a*. The mode of the complex marking also includes a mode other than the lane markings 61 and 62 in FIG. 2.

A determination line 63 is set on the traveling road image 60 in order to determine whether these lane markings 61 and 62 are complex markings. The determination line 63 is set in a direction that intersects the lane markings 61 and 62. For example, the determination line 63 is set in a horizontal direction or crosswise direction on the traveling road image 60. A plurality of these determination lines 63 are set spaced a predetermined distance apart along the traveling road. For example, a plurality of the determination lines 63 are set spaced at regular intervals along the traveling road. The area where the plurality of determination lines 63 are set is a preset area.

In FIG. 1, on the traveling road image, the region setting portion 12 sets a lane marking display region in a position where a lane marking is shown, and sets a road surface display region in a position closer toward the center of the traveling road than this lane marking display region, and where a road surface other than the lane marking is shown. The lane marking display region may be a display region that includes a lane marking, but does not have to be region where only a lane marking is shown. The road surface display region is a region that shows a road surface that is not a lane marking. The lane marking display region and the road surface display region are set side-by-side along the determination line set on the traveling road image.

Figure 3:
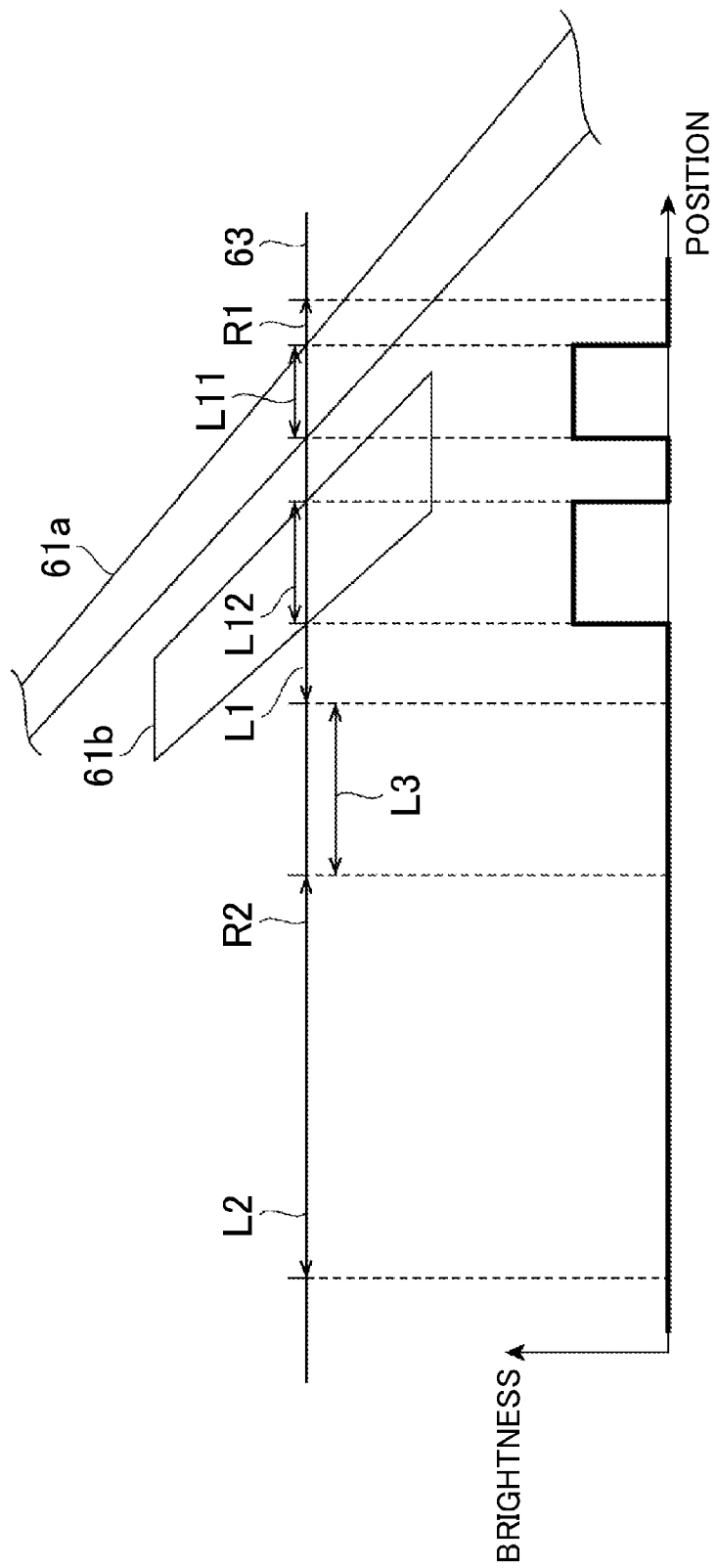
FIG. 3 is an explanatory view of region setting in the complex marking determining device in FIG. 1.

For example, as shown in FIG. 3, a lane marking display region R1 and a road surface display region R2 are set side-by-side along the determination line 63. In FIG. 3, to simplify the description, the areas of the lane marking display region R1 and the road surface display region R2 are shown by arrows, but on the image, the lane marking display region R1 and the road surface display region R2 are set as horizontally long regions by a plurality of pixels. More specifically, the lane marking display region R1 and the road surface display region R2 are set as regions of a size that is one pixel vertically and a plurality of pixels horizontally. Also, the lane marking display region R1 and the road surface display region R2 may be set as two or more pixels vertically. Furthermore, the number of pixels in the crosswise direction may be set differently for the lane marking display region R1 and the road surface display region R2.

The position of the lane marking display region R1 in the crosswise direction is set based on the position where the lane marking 61 is shown. For example, in the complex marking determining routine that is repeatedly performed, the position of the lane marking display region R1 may be set using the position information of the lane marking 61 in the most recent determination. Also, the position of the initial lane marking display region R1 may be a preset position, and the position thereafter may be adjusted according to the detected position of the lane marking 61.

A length L1 of the lane marking display region R1 in the crosswise direction is set to a length that enables the complex marking to be displayed. Also, the length L1 of the lane marking display region R1 in the crosswise direction may be set, for example, to a length whereby a line portion of a complex marking is displayed in at least half of the lane marking display region R1, and whereby road surface other than the line portion of a single marking is displayed in at least half of the lane marking display region R1. More specifically, in FIG. 3, when the lane marking 61 is a complex marking, and the length of the solid line 61*a* of the lane marking 61 is L11 and the length of the additional line 61*b* is L12, the length L1 of the lane marking display region R1 in the crosswise direction is set such that $L1/2 \leq L11+L12$ is satisfied. On the other hand, if the lane marking 61 is a single marking of only the solid line 61*a*, the length L1 of the lane marking display region R1 in the crosswise direction is set such that $L1/2 \leq L1-L11$ is satisfied. Setting the length L1 of the lane marking display region R1 in the crosswise direction in this way enables the complex marking determination process to be performed easily. That is, when a median value of the brightness value of the pixels that make up the lane marking display region R1 is calculated, the median value is a brightness value of a white line or approximately the brightness value of a white line when the lane marking 61 is a complex marking, and is a brightness value of a road surface or approximately the brightness value of a road surface when the lane marking 61 is a single marking. As a result, the determination process is able to be performed by a simple calculation, and the determination accuracy increases.

The median value is a median value that is typically used with statistical processing, and is a value that is positioned in the center when the brightness value of the pixels of the lane marking display region R1 are lined up in ascending or descending order. If the number of pixels of the lane marking display region R1 in the crosswise direction is even, the brightness value of one of the two pixels near the center may be selected, or the average value of the brightness values of these two pixels may be made the median value. Here, the length L1 of the lane marking display region R1 in the crosswise direction is proportional to the number of pixels of the lane marking display region R1 in the crosswise direction. Therefore, in the description here, the length L1 may be read as the number of pixels of the lane marking display region R1 in the crosswise direction.

In FIG. 3, the road surface display region R2 is set in a position closer to the center of the traveling road than the lane marking display region R1, which is a position that is a predetermined distance L3 away from the lane marking display region R1. A length L2 of the road surface display region R2 in the crosswise direction may be the same length as the lane marking display region R1, but it may also be set shorter than the length L1 of the lane marking display region R1 in the crosswise direction. In this case, a road surface marking is inhibited from being displayed in the road surface display region R2, so the brightness state of the road surface of the traveling road is able to be appropriately calculated. Here, a road surface marking corresponds to a marking of a speed limit or the like displayed on a road surface of the traveling road.

Figure 4:
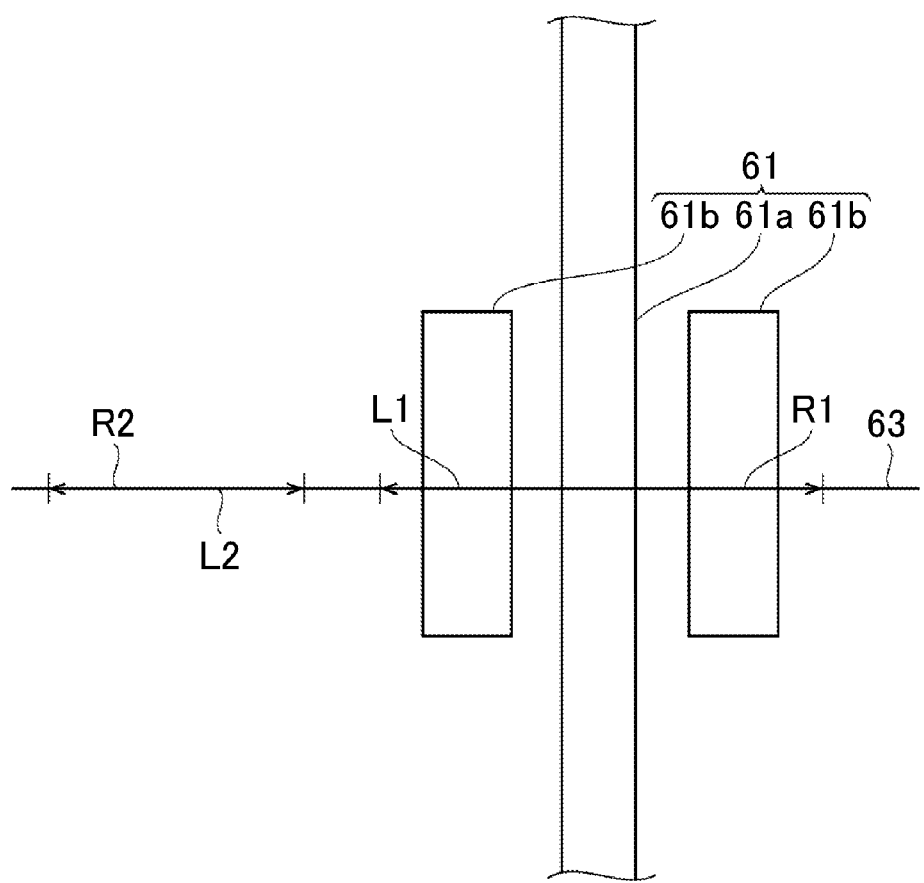
FIG. 4 is another explanatory view of region setting in the complex marking determining device in FIG. 1.

When the lane marking 61 is formed by the solid line 61a and two additional lines 61b, as shown in FIG. 4, the length L1 of the lane marking display region R1 in the crosswise direction may be set such that the length of one-half of this length L1 is equal to or less than the total length of the widths of the solid line 61a and the two additional lines 61b. As a result, the complex marking determination process is able to be performed easily, just as described above.

In FIGS. 3 and 4, the region setting of the lane marking 61 on the right side of the lane is described, but the region setting for the lane marking 62 on the left side of the lane is also performed in the same manner. Also, when a plurality of the determination lines 63 are set in the traveling road image 60, the lane marking display region R1 and the road surface display region R2 are set for each determination line 63.

In FIG. 1, the brightness state calculating portion 13 is a calculating portion that calculates or computes a lane marking representative value indicative of the brightness state of the plurality of pixels that make up the lane marking display region, and calculates or computes a road surface representative value indicative of the brightness state of the plurality of pixels that make up the road surface display region. For example, the brightness state calculating portion 13 calculates a median value of the brightness values of the plurality of pixels that make up the lane marking display region as a lane marking display value, and calculates a median value of the brightness values of the plurality of pixels that make up the road surface display region as the road surface representative value. More specifically, the brightness state calculating portion 13 calculates the brightness values of all of the pixels that make up the lane marking display region, and calculates the brightness value that is in the center, when the brightness values of these pixels are lined up in an ascending or descending order, as the median value. The brightness state calculating portion 13 also calculates the brightness values of all of the pixels that make up the road surface display region, and calculates the brightness value that is in the center, when the brightness values of these pixels are lined up in an ascending or descending order, as the median value. At this time, in the lane marking display region and the road surface display region, if the number of pixels is even, either one of the two brightness values positioned in the center may be taken as the median value of the region, or the average value of these two brightness values may be taken as the median value.

The lane marking representative value indicative of the brightness state of the plurality of pixels that make up the lane marking display region, and the road surface representative value indicative of the brightness state of the plurality of pixels that make up the road surface display region, may be values other than the median values as long as they are representative values indicative of the brightness states of the pixels of the regions. For example, average values of the pixels of the regions may be calculated as the representative values.

The complex marking determining portion 14 determines that the lane marking is a complex marking when a degree of deviation between the lane marking representative value of the lane marking display region and the road surface representative value of the road surface display region is equal to or greater than a preset threshold value. Also, the complex marking determining portion 14 determines that the lane marking is a single marking and not a complex marking when the degree of deviation between the lane marking representative value of the lane marking display region and the road surface representative value of the road surface display region is not equal to or greater than the threshold value. When the lane marking of the traveling road is a complex marking, the degree of deviation between the lane marking representative value of the lane marking display region and the road surface representative value of the road surface display region will be larger than it will be when the lane marking is a single marking. Therefore, it is possible to determine whether the lane marking is a complex marking based on this degree of deviation.

For example, a ratio of the lane marking representative value and the road surface representative value may be used as the degree of deviation between the lane marking representative value of the lane marking display region and the road surface representative value of the road surface display region. A value set in the complex marking determining portion 14 beforehand may be used as the threshold value of the ratio used in this determination. More specifically, when the lane marking representative value is pv2 and the road surface representative value is pv1, it is determined whether the ratio pv2/pv1 is equal to or greater than a preset threshold value S of the ratio. If the ratio pv2/pv1 is equal to or greater than the threshold value S, it is determined that the lane marking is a complex marking, and if the ratio pv2/pv1 is not equal to or greater than the threshold value S, it is determined that the lane marking is not a complex marking.

Also, the difference between the lane marking representative value and the road surface representative value, or the absolute value of this difference, may be used as the degree of deviation between the lane marking representative value of the lane marking display region and the road surface representative value of the road surface display region. A value set in the complex marking determining portion 14 beforehand may be used as the threshold value used in this determination. In this case, if the absolute value of the difference between the lane marking representative value and the road surface representative value is equal to or greater than the threshold value, it is determined that the lane marking is a complex marking, and if the absolute value of the difference between the lane marking representative value and the road surface representative value is not equal to or greater than the threshold value, it is determined that the lane marking is not a complex marking.

The degree of deviation between the lane marking representative value of the lane marking display region and the road surface representative value of the road surface display region may also be calculated using a value other than the ratio of, and difference between, the lane marking representative value and the road surface representative value, as long as the degree of deviation between the brightness values of the lane marking representative value and the road surface representative value is able to be determined.

Next, the operation of the complex marking determining device 1 according to this example embodiment and a complex marking determining method according to this example embodiment will be described.

Figure 5:
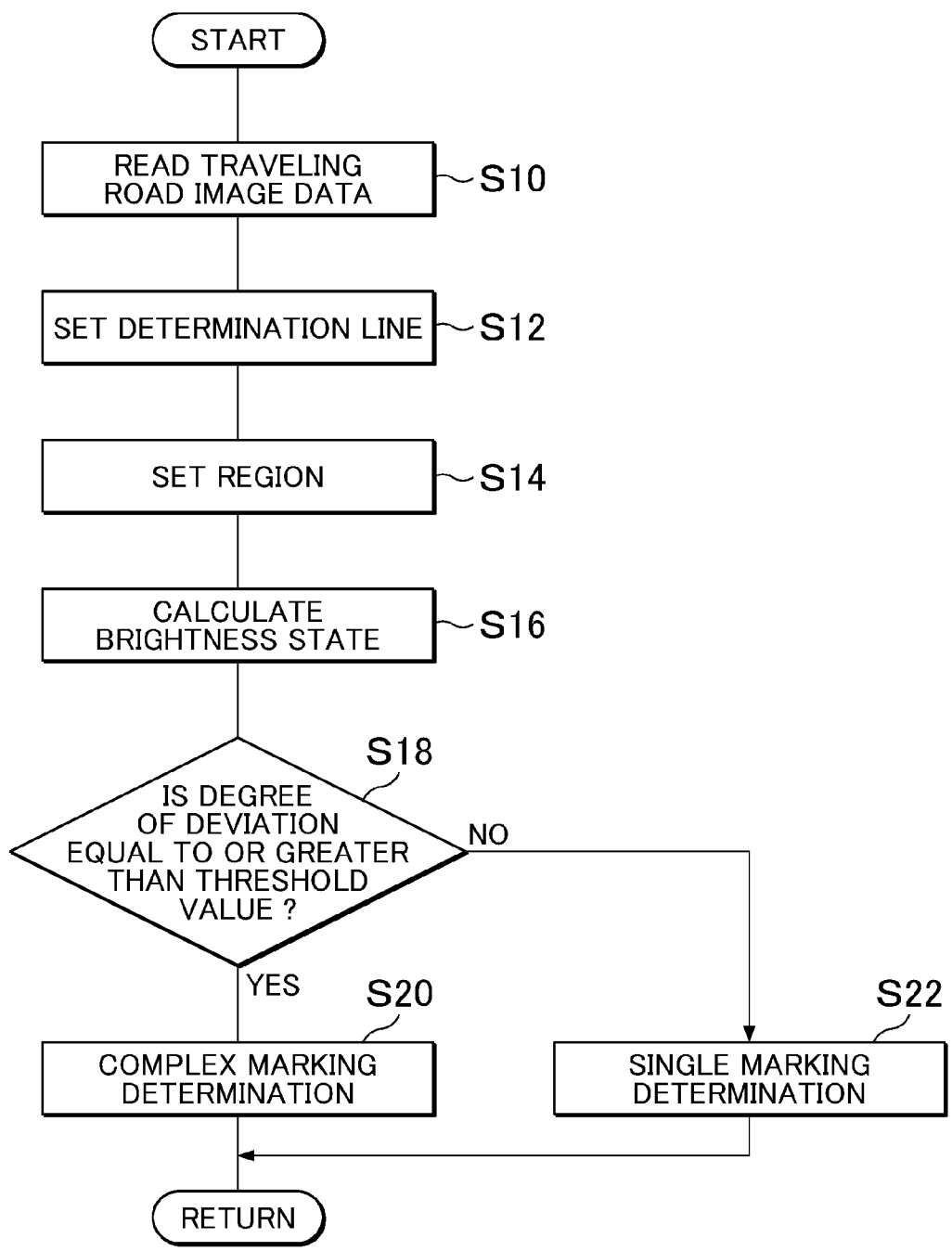
FIG. 5 is a flowchart of a complex marking determining routine of the complex marking determining device in FIG. 1.

FIG. 5 is a flowchart illustrating a complex marking determining routine of the complex marking determining method and the complex marking determining device 1 according to the example embodiment. The complex marking determining routine is started by the ECU 10 in response to the start of vehicle control or driving assist control, for example, and is repeatedly executed at predetermined cycles.

First, a traveling road image reading process is performed as shown in step S10 in FIG. 5. The traveling road image reading process is a process of reading image data captured by the camera 2. For example, the image data of the traveling road image 60 shown in FIG. 2 is read.

Then the process proceeds on to step S12 in FIG. 5, where a determination line setting process is performed. The determination line setting process is performed by the determination line setting portion 11. In this process, the determination line 63 is set on the traveling road image 60, as shown in FIG. 2. The determination line 63 is set pointing in the horizontal direction or the crosswise direction on the traveling road image 60. A plurality of these determination lines 63 are set spaced a predetermined distance apart from each other along the traveling road.

Next, the process proceeds on to step S14 in FIG. 5, where a region setting process is performed. The region setting process is a process of setting the lane marking display region and the road surface display region, and is performed by the region setting portion 12. That is, the lane marking display region is set to a position where the lane marking is shown on the traveling road image, and the road surface display region is set to a position that is closer to the center of the traveling road than the lane marking display region, and where the road surface other than the lane marking is shown.

For example, the lane marking display region R1 and the road surface display region R2 are set lined up along the determination line 63, as shown in FIG. 3. The position of the lane marking display region R1 in the crosswise direction is set based on the position where the lane marking 61 is shown. For example, the position of the lane marking display region R1 is set using the position information of the lane marking 61 of the most recent determination, in the complex marking determining routine that is repeatedly performed. Also, the road surface display region R2 is set to a position that is closer to the center of the traveling road than the lane marking display region R1, and that is a predetermined distance L3 away from the lane marking display region R1. The length L2 of the road surface display region R2 in the crosswise direction may be the same length as the lane marking display region R1, but it may also be set shorter than the length L1 of the lane marking display region R1 in the crosswise direction.

The region setting of the lane marking display region R1 and the road surface display region R2 is performed for the left and right lane markings 61 and 62. Also, the region setting of the lane marking display region R1 and the road surface display region R2 is performed for each determination line 63.

Then the process proceeds on to step S16 in FIG. 5, where a brightness state calculating process is performed. The brightness state calculating process is a process of calculating or computing a lane marking representative value indicative of the brightness state of a plurality of pixels that make up the lane marking display region R1, and calculating or computing a road surface representative value indicative of the brightness state of a plurality of pixels that make up the road surface display region R2. For example, the median value of the brightness values of the plurality of pixels that make up the lane marking display region R1 is calculated as a lane marking representative value, and the median value of the brightness values of the plurality of pixels that make up the road surface display region R2 is calculated as a road surface representative value. An average value of the brightness values may be used as the lane marking representative value and the road surface representative value, or a value indicative of the brightness state of the pixels of the lane marking display region R1 and the road surface display region R2 may be used.

Then the process proceeds on to step S18 where it is determined whether the degree of deviation between the lane marking representative value and the road surface representative value is equal to or greater than a threshold value. This determination process is performed by the complex marking determining portion 14. The ratio of the lane marking representative value and the road surface representative value, for example, may be used as the degree of deviation between the lane marking representative value and the road surface representative value. More specifically, when the lane marking representative value is pv2 and the road surface representative value is pv1, it is determined whether the ratio pv2/pv1 is equal to or greater than a preset threshold value S of the ratio. If the ratio pv2/pv1 is equal to or greater than the threshold value S, it is determined that the lane marking is a complex marking (step S20), and if the ratio pv2/pv1 is not equal to or greater than the threshold value S, it is determined that the lane marking is not a complex marking (step S22).

The difference between the lane marking representative value and the road surface representative value may be used as the degree of deviation between the lane marking representative value and the road surface representative value. Also, a value other than the ratio of, and difference between, the lane marking representative value and the road surface representative value may also be used, as long as the degree of deviation between the brightness values of the lane marking representative value and the road surface representative value is able to be determined. Once the process in step S20 or step S22 is finished, this series of control processes ends.

In the series of control processes in FIG. 5, the order of the control processes may be interchanged, or execution of one or some of the control processes may be omitted as long as the control result is not affected.

Next, a lane marking detection apparatus using the complex marking determining device 1 according to this example embodiment will be described.

Figure 6:
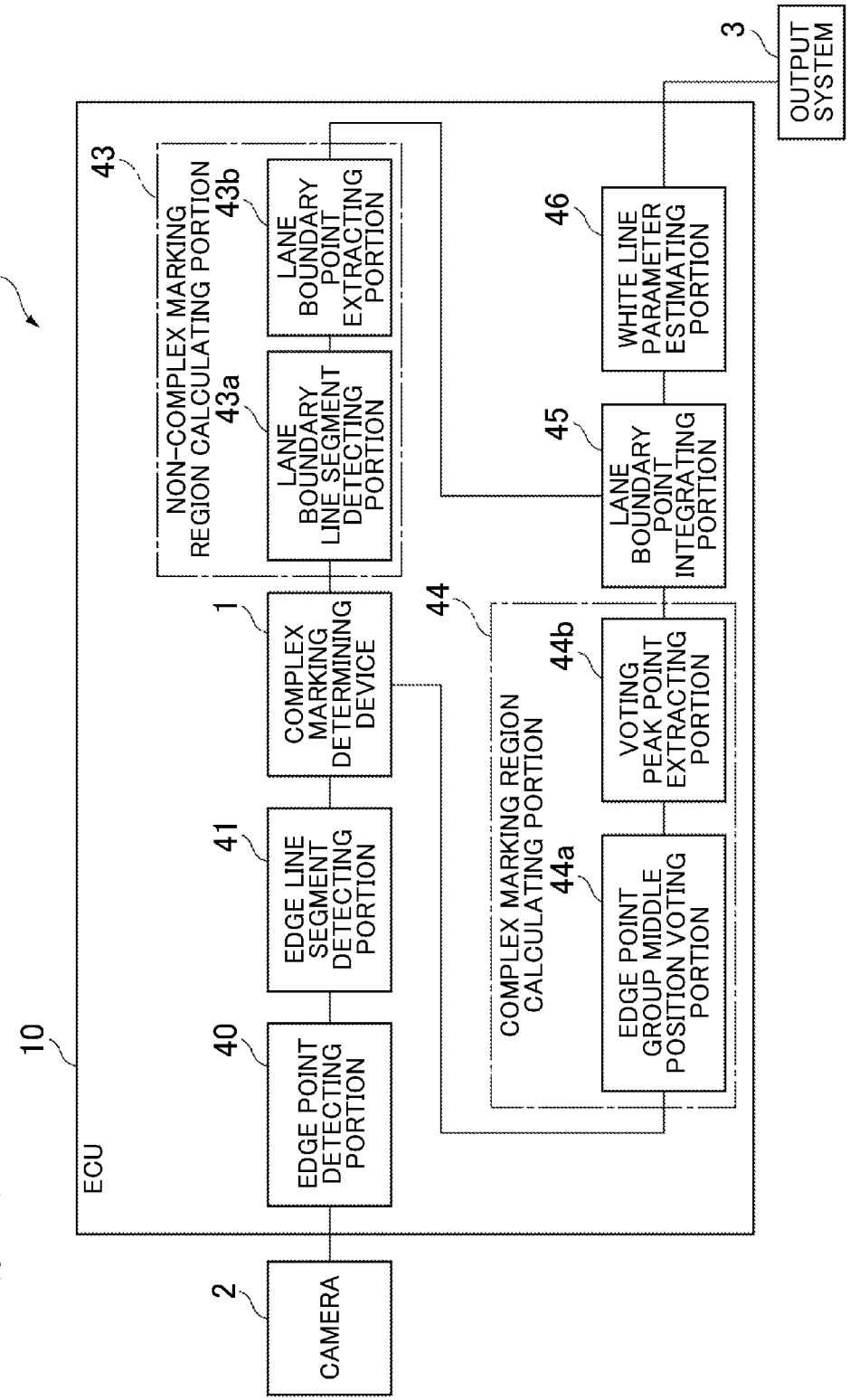
FIG. 6 is a general diagram of the structure of a lane marking detection apparatus using the complex marking determining device in FIG. 1.
Figure 7:
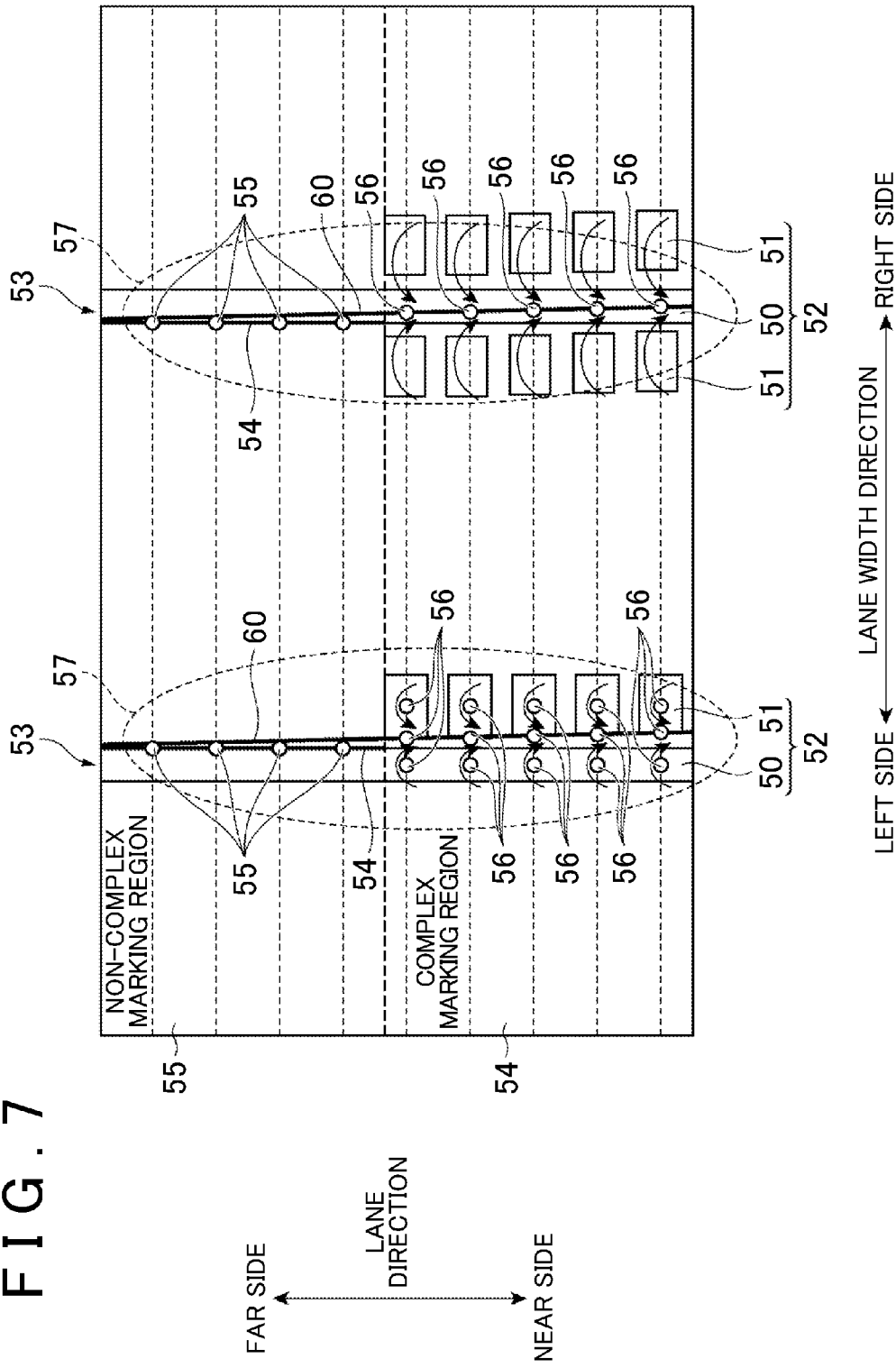
FIG. 7 is an explanatory view of a traveling road image used by the lane marking detection apparatus in FIG. 6.

FIG. 6 is a general diagram of the structure of a lane marking detection apparatus 90 using the complex marking determining device 1. FIG. 7 is an explanatory view of the traveling road image that captures the road on which the vehicle is traveling (i.e., the traveling road).

The lane marking detection apparatus 90 is an apparatus that detects a lane marking on a road surface of the traveling road of the vehicle. This lane marking detection apparatus 90 determines whether the lane marking is a complex marking or a non-complex marking based on the traveling road image that captures the traveling road, and detects a lane marking by using a different feature point detection method for the complex marking region than for the non-complex marking region.

The lane marking detection apparatus 90 includes the ECU 10. This ECU 10 is similar to the ECU 10 of the complex marking determining device 1 described above, but with the addition of a function that detects a lane marking. The ECU 10 includes an edge point detecting portion 40, an edge line segment detecting portion 41, a complex marking determining device 1, a non-complex marking region calculating portion 43, a complex marking region calculating portion 44, a lane boundary point integrating portion 45, and a white line parameter estimating portion 46.

The edge point detecting portion 40 detects an edge point in the traveling road image captured by the camera 2. An edge point is a point where the brightness value of adjacent pixels of the traveling road image changes equal to or more than a predetermined value. A known detection method may be used for the edge point detection method. As shown in FIG. 7, the edge point detecting portion 40 detects an edge point on a detection line (the dashed line in FIG. 7) set in the crosswise direction on a traveling road image 53. A plurality of the detection lines are set at predetermined intervals along the traveling road, and an edge point is detected for each determination line.

The edge line segment detecting portion 41 calculates or computes an edge line segment that connects edge points, based on information of the edge points detected by the edge point detecting portion 40. That is, an edge line segment is calculated so as to connect together the edge points detected for each determination line that are adjacent. Hough transformation, for example, may be used as the edge line segment calculating method. Also, another method or the like may also be used as long as the edge line segment is able to be calculated. The calculation of this edge line segment is performed for the areas near the lane markings on the left and right sides of the lane.

The complex marking determining device 1 described above is used, and determines whether the lane marking is a complex marking or a non-complex marking based on the traveling road image.

The non-complex marking region calculating portion 43 detects a lane boundary line segment 54 of the lane marking for a non-complex marking region B2 that is a region of the traveling road where the lane marking is a non-complex marking, and extracts a lane boundary point 55 from the lane boundary line segment 54. This non-complex marking region calculating portion 43 includes a lane boundary line segment detecting portion 43a and a lane boundary point extracting portion 43b.

The lane boundary line segment detecting portion 43a detects the lane boundary line segment 54 of the lane marking. For example, the lane boundary line segment detecting portion 43a detects an edge line segment that is closest to the center of the lane from among the detected edge line segments, based on the position, length, and slope and the like, of the edge line segments detected by the edge line segment detecting portion 41, as the lane boundary line segment 54. This detection of the lane boundary line segment 54 is performed at both left and right positions in the lane width direction.

The lane boundary point extracting portion 43b extracts the lane boundary point 55 based on the lane boundary line segment 54 detected by the lane boundary line segment detecting portion 43a. For example, the lane boundary point extracting portion 43b extracts the edge point that forms each lane boundary line segment 54, for each determination line, and makes this the lane boundary point 55. This extraction of the lane boundary point 55 is performed at both left and right positions in the lane width direction.

The complex marking region calculating portion 44 calculates a potential point 56 of a middle point of a complex marking 52, for a complex marking region B1 that is a region of the traveling road where the lane marking is a complex marking. For example, the complex marking region calculating portion 44 performs voting toward a predetermined middle position of an edge point group of the complex marking 52, and calculates the voting peak point as the potential point 56 of the middle point of the complex marking 52. The complex marking region calculating portion 44 includes an edge point group middle position voting portion 44a, and a voting peak point extracting portion 44b.

Figure 8:
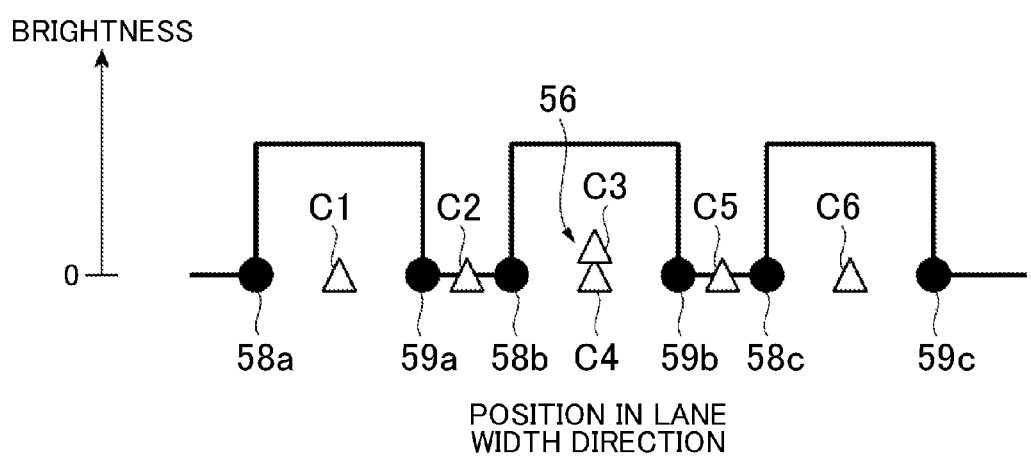
FIG. 8 is an explanatory view of center position voting of edge points in the lane marking detection apparatus in FIG. 6.

For example, as shown in FIG. 8, the edge point group middle position voting portion 44a selects rising edge points 58a, 58b, and 58c and falling edge points 59a, 59b, and 59c that are presumed to indicate a lane boundary line 50 and an additional line 51. Then the edge point group middle position voting portion 44a selects, as combinations in which the interval in the lane width direction is within a predetermined threshold value, the rising edge point 58a and the falling edge point 59a, the falling edge point 59a and the rising edge point 58b, the falling edge point 59a and the rising edge point 58c, the rising edge point 58b and the falling edge point 59b, the falling edge point 59b and the rising edge point 58c, and the rising edge point 58c and the falling edge point 59c, for example. Then, the edge point group middle position voting portion 44a votes on a middle position C1 between the rising edge point 58a and the falling edge point 59a, a middle position C2 between the falling edge point 59a and the rising edge point 58b, a middle position C3 between the falling edge point 59a and the rising edge point 58c, a middle position C4 between the rising edge point 58b and the falling edge point 59b, a middle position C5 between the falling edge point 59b and the rising edge point 58c, and a middle position C6 between the rising edge point 58c and the falling edge point 59c.

Figure 9:
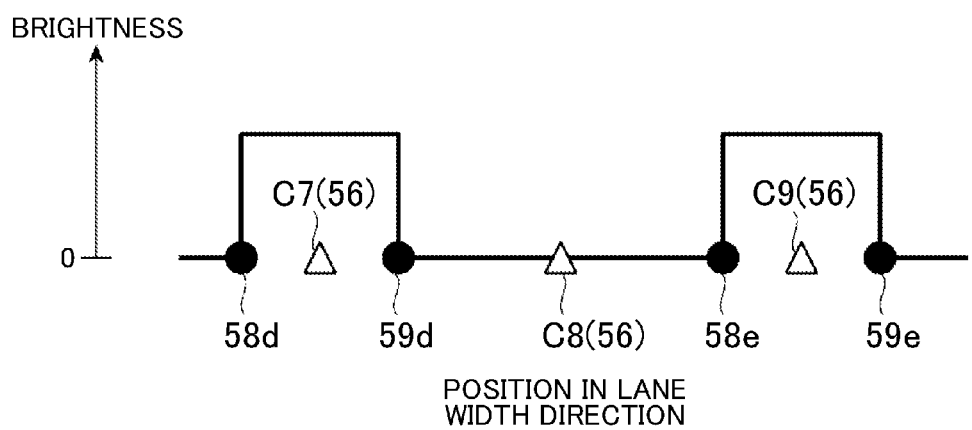
FIG. 9 is another explanatory view of center position voting of edge points in the lane marking detection apparatus in FIG. 6.

Also, in the example in FIG. 9, the edge point group middle position voting portion 44a selects rising edge points 58d and 58e and falling edge points 59d and 59e that are presumed to indicate the lane boundary line 50 and the additional line 51. Then the edge point group middle position voting portion 44a selects, as combinations in which the interval in the lane width direction is within a predetermined threshold value, the rising edge point 58d and the falling edge point 59d, the falling edge point 59d and the rising edge point 58e, and the rising edge point 58e and the falling edge point 59e, for example. Then, the edge point group middle position voting portion 44a votes on a middle position C7 between the rising edge point 58d and the falling edge point 59d, a middle position C8 between the falling edge point 59d and the rising edge point 58e, and a middle position C9 between the rising edge point 58e and the falling edge point 59e.

The voting peak point extracting portion 44b calculates the potential point 56 for a middle point of the complex marking 52, according to the voting by the edge point group middle position voting portion 44a. For example, the voting peak point extracting portion 44b calculates the middle position with the largest number of votes, i.e., the voting peak point, as the potential point 56 for the middle point of the complex marking 52. More specifically, in the example in FIG. 8, the middle positions C3 and C4 are voting peak points, so the middle position C3 or C4 is calculated as the potential point 56 for the middle point of the complex marking 52. Also, in the example in FIG. 9, the middle positions C7, C8, and C9 have the same number of votes, so these middle positions C7, C8, and C9 are all calculated as potential points 56 for the middle point of the complex marking 52.

In FIG. 6, the lane boundary point integrating portion 45 creates an integrated lane boundary point group 57 based on the potential point 56 for the middle point of the complex marking 52 calculated by the complex marking region calculating portion 44 and the lane boundary point 55 calculated by the non-complex marking region calculating portion 43.

The white line parameter estimating portion 46 estimates a white line parameter as a lane boundary line parameter indicative of the lane boundary line 50, based on the integrated lane boundary point group 57. For example, the white line parameter estimating portion 46 estimates a white line parameter by fitting a model to the integrated lane boundary point group 57 that has been integrated by the lane boundary point integrating portion 45. More specifically, the white line parameter estimating portion 46 estimates a curve indicative of the edge line on the lane center side of the lane boundary line 50 from the integrated lane boundary point group 57 using a least squares method or the like. The white line parameter is estimated as a coefficient of an expression that expresses the curve, for example.

In this way, using the complex marking determining device 1 according to the example embodiment in the lane marking detection apparatus 90 that detects a lane marking by dividing lane markings on a traveling road into a complex marking region and a non-complex marking region, enables the complex marking determination to be accurately performed, so highly accurate lane marking detection becomes possible.

The complex marking determining device 1 according to the example embodiment may also be used in an apparatus other than the lane marking detection apparatus 90 described above.

As described above, with the complex marking determining device 1 and the complex marking determining method according to the example embodiment, it is possible to determine whether a lane marking is a complex marking, even if the position of the lane marking is unable to be accurately detected, by determining that the lane marking is a complex marking when the degree of deviation between the lane marking representative value indicative of the brightness state of the lane marking display region and the road surface representative value indicative of the brightness state of the road surface display region is equal to or greater than the preset threshold value. Therefore, even if the detection accuracy of the position of a lane marking is reduced due to a decrease in resolution of the traveling road image or the like, a decrease in the complex marking determination accuracy is able to be inhibited, so the complex marking determination accuracy is able to be improved.

For example, as shown in FIG. 3, the lane marking is determined to be a complex marking when the degree of deviation between the lane marking representative value indicative of the brightness state of the lane marking display region R1 and the road surface representative value indicative of the brightness state of the road surface display region R2 is equal to or greater than a preset threshold value. When the lane marking 61 is a complex marking, the region that the lane marking 61 occupies in the lane marking display region R1 becomes larger, so the state of the brightness value increases for the entire region, compared to when the lane marking 61 is a single marking. Therefore, the degree of deviation between the lane marking representative value and the road surface representative value becomes larger. On the other hand, when the lane marking 61 is a single marking, the region that the lane marking 61 occupies in the becomes smaller, so the state of the brightness value decreases for the entire region, compared to when the lane marking 61 is a complex marking. Therefore, the degree of deviation between the lane marking representative value and the road surface representative value becomes smaller. Thus, it is possible to determine whether the lane marking 61 is a complex marking based on the degree of deviation between the lane marking representative value and the road surface representative value.

Also, by determining whether the lane marking 61 is a complex marking based on the degree of deviation between the lane marking representative value and the road surface representative value, it is possible to determine whether the lane marking 61 is a complex marking even if the position of the lane marking 61 or the brightness gradient of the lane marking 61 is unable to be accurately detected. The resolution of the image of the lane marking 61 decreases farther away from the vehicle, but even in such a case, a decrease in the complex marking determination accuracy is able to be inhibited, so the complex marking determination accuracy is able to be improved.

Also, with the complex marking determining device 1 and the complex marking determining method according to the example embodiment, the lane marking representative value and the road surface representative value are able to be calculated by a simple calculation process, by calculating the median value of the brightness values of a plurality of pixels that make up the lane marking display region as the lane marking representative value, and calculating the median value of the brightness values of a plurality of pixels that make up the road surface display region as the road surface representative value. Therefore, the complex marking determination is able to be performed quickly.

Further, with the complex marking determining device 1 and the complex marking determining method according to the example embodiment, the lane marking representative value and the road surface representative value are able to be calculated by a simple calculation process, by calculating the average value of the brightness values of a plurality of pixels that make up the lane marking display region as the lane marking representative value, and calculating the average value of the brightness values of a plurality of pixels that make up the road surface display region as the road surface representative value. Therefore, the complex marking determination is able to be performed quickly.

Next, a second example embodiment of the invention will be described.

Figure 10:
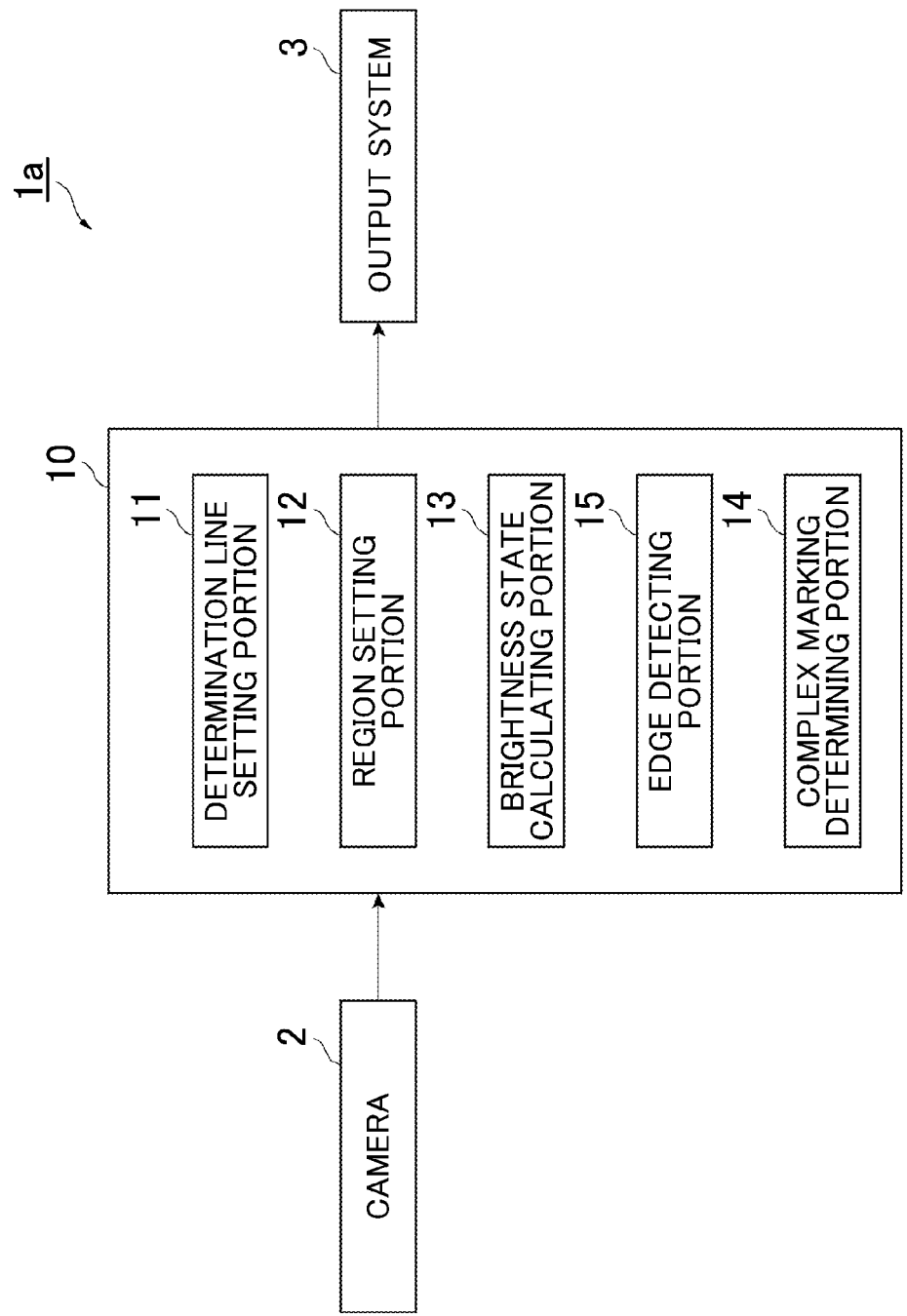
FIG. 10 is a general diagram of the structure of a complex marking determining device according to a second example embodiment of the invention.

FIG. 10 is a general diagram of the structure of a complex marking determining device 1a according to this second example embodiment.

The complex marking determining device 1a according to this example embodiment is structured almost the same as the complex marking determining device 1 according to the first example embodiment, but differs in that it includes an edge detecting portion 15, and the determination of whether a lane marking is a complex marking is made using the number of edge points in the traveling road image, by the complex marking determining portion 14.

In FIG. 10, the edge detecting portion 15 detects edge points of the lane marking display region R1 and the road surface display region R2. An edge point is a point where the amount of change in the brightness value (i.e., the brightness gradient) between adjacent pixels is equal to or greater than a predetermined value, in the lane marking display region R1 and the road surface display region R2. A known method may be used for the method of this edge detection.

The complex marking determining portion 14 determines whether the degree of deviation between a lane marking representative value of the lane marking display region R1 and a road surface representative value of the road surface display region R2 is equal to or greater than a preset threshold value, just as described in the first example embodiment. If the degree of deviation between the lane marking representative value of the lane marking display region R1 and the road surface representative value of the road surface display region R2 is not equal to or greater than the preset threshold value, the complex marking determining portion 14 determines that the lane marking is not a complex marking. On the other hand, if the degree of deviation between the lane marking representative value of the lane marking display region R1 and the road surface representative value of the road surface display region R2 is equal to or greater than the preset threshold value, the complex marking determining portion 14 determines whether the number of edge points in the lane marking display region R1 detected by the edge detecting portion 15 is equal to or greater than a preset second threshold value. Here, if the number of edge points in the lane marking display region R1 is equal to or greater than the preset second threshold value, it is determined that the lane marking is a complex marking. On the other hand, if the number of edge points in the lane marking display region R1 is not equal to or greater than the second threshold value, it is determined that the lane marking is a single marking.

Having the complex marking determining portion 14 determine whether the lane marking is a complex marking taking into account not only the degree of deviation between the lane marking representative value of the lane marking display region R1 and the road surface representative value of the road surface display region R2, but also the number of edge points in the lane marking display region R1 in this way makes it possible to inhibit an erroneous determination that a lane marking is a complex marking when the lane marking is a single marking that is thicker than usual, which in turn enables the accuracy of the complex marking determination to be further improved.

Also, when the degree of deviation between the lane marking representative value of the lane marking display region R1 and the road surface representative value of the road surface display region R2 is equal to or greater than the threshold value, the complex marking determining portion 14 may also determine whether the number of edge points of the lane marking display region R1 detected by the edge detecting portion 15 is equal to or greater than a preset second threshold value, and whether the ratio of the number of edge points in the lane marking display region R1 to the number of edge points in the road surface display region R2 is equal to or greater than a third threshold value. In this case, if the number of edge points in the lane marking display region R1 detected by the edge detecting portion 15 is equal to or greater than the second threshold value, and a ratio of the number of edge points in the lane marking display region R1 to the number of edge points in the road surface display region R2 is equal to or greater than the third threshold value, the complex marking determining portion 14 determines that the lane marking is a complex marking.

Next, the operation of the complex marking determining device 1a and the complex marking determining method according to the second example embodiment will be described.

Figure 11:
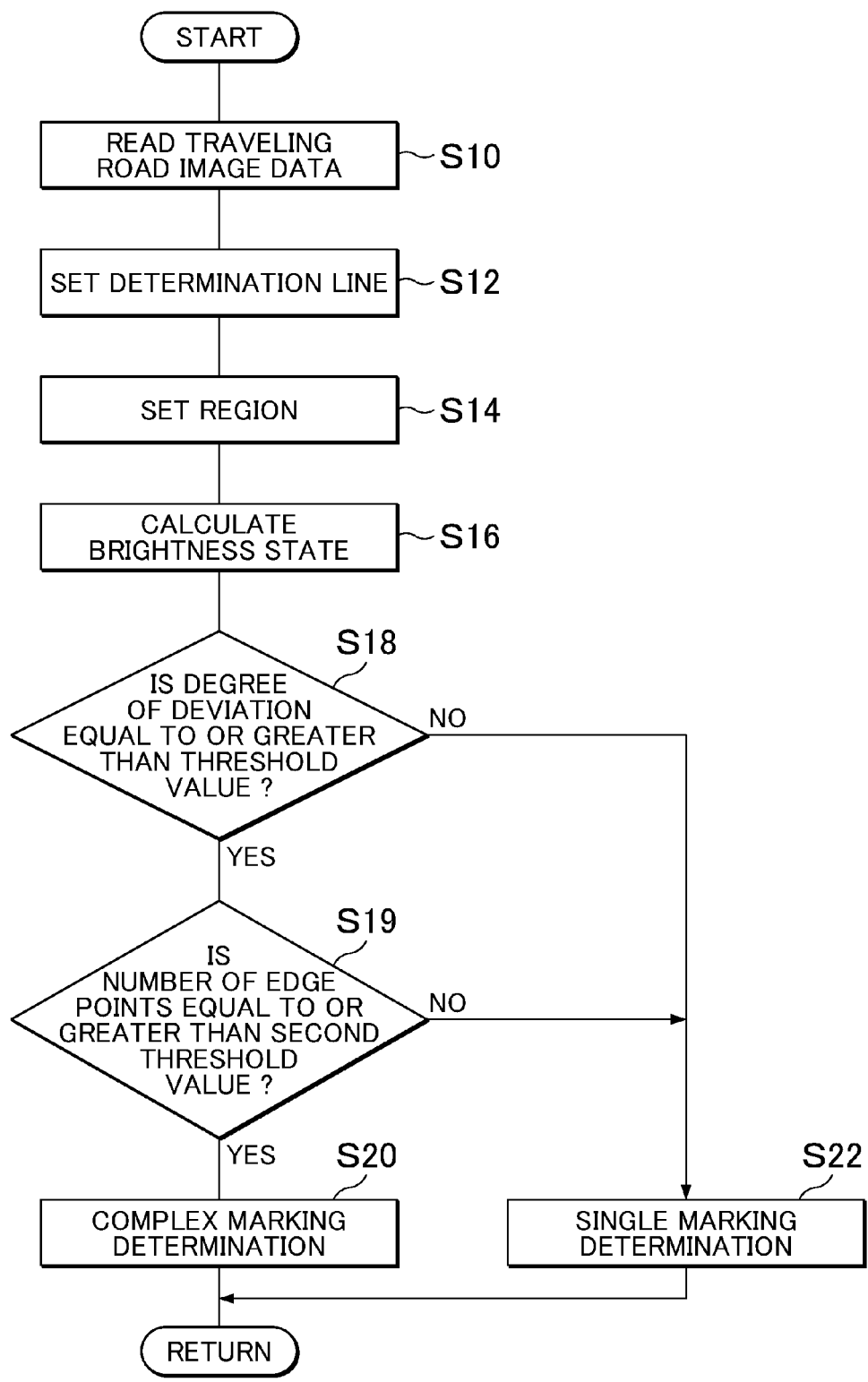
FIG. 11 is a flowchart illustrating a complex marking determining routine of the complex marking determining device in FIG. 10.

FIG. 11 is a flowchart of a complex marking determining routine of the complex marking determining device 1a and the complex marking determining method according to the second example embodiment. This complex marking determining routine is started by the ECU 10 in response to the start of vehicle control or vehicle assist control, for example, and is repeatedly executed at predetermined cycles.

First, the processes of steps S10 to S18 in FIG. 11 are performed, similar to steps S10 to S18 in FIG. 5. If it is determined in step S18 in FIG. 11 that the degree of deviation between the lane marking representative value and the road surface representative value is not equal to or greater than the threshold value, then it is determined that the lane marking is a single marking and not a complex marking (step S22). On the other hand, if it is determined in step S18 that the degree of deviation between the lane marking representative value and the road surface representative value is equal to or greater than the threshold value, then it is determined whether the number of edge points detected in the lane marking display region R1 is equal to or greater than the preset second threshold value (step S19). If it is determined in step S19 that the number of edge points detected in the lane marking display region R1 is equal to or greater than the preset second threshold value, then it is determined that the lane marking is a complex marking (step S20). On the other hand, if it is determined in step S19 that the number of edge points detected in the lane marking display region R1 is not equal to or greater than the preset second threshold value, then it is determined that the lane marking is a single marking (step S22). When the lane marking is a complex marking, the determination was made with a focus on the increase in the number of edge points, compared to when the lane marking is a single marking.

In step S19, it may also be determined whether the number of edge points detected in the lane marking display region R1 is equal to or greater than the second threshold value, and whether a ratio of the number of edge points in the lane marking display region R1 to the number of edge points in the road surface display region R2 is equal to or greater than the third threshold value. Once the process in step S20 or step S22 is finished, this series of control processes ends. In the series of control process in FIG. 11, the order of the control processes may be interchanged, or execution of one or some of the control processes may be omitted as long as the control result is not affected.

As described above, with the complex marking determining device 1a and the complex marking determining method according to the second example embodiment, in addition to the operation and effects obtained by the complex marking determining device 1 and the complex marking determining method according to the first example embodiment, it is possible to inhibit an erroneous determination in which, when a lane marking is a single marking that is thicker than usual, this thick single marking is determined to be a complex marking, from being made, which consequently enables an even more accurate complex marking determination to be made.

The example embodiments described above describe only some complex marking determining devices and complex marking determining methods according to the invention. The complex marking determining device and the complex marking determining method according to the invention is not limited to those described in the foregoing example embodiments. The complex marking determining device and the complex marking determining method according to the example embodiments described above may be modified without departing from the scope of the claims, or may applied to something other than a vehicle.

What is claimed is:

1. A complex marking determining device comprising:
 a camera that captures an image of a traveling road of a vehicle, and obtains a traveling road image; and
 an electronic control unit configured to:
 set a lane marking display region in a position where a lane marking is displayed, in the traveling road image obtained by the camera, and set a road surface display region in a position that is closer to a center of the traveling road than the lane marking display region, and where a road surface other than the lane marking is displayed, in the traveling road image;

calculate a lane marking representative value indicative of a brightness state of a plurality of pixels that make up the lane marking display region, and calculate a road surface representative value indicative of a brightness state of a plurality of pixels that make up the road surface display region;

determine that the lane marking is a complex marking at least when a degree of deviation between the lane marking representative value and the road surface representative value is equal to or greater than a first threshold value;

detect a number of edge points in the lane marking display region, and determine that the lane marking is a complex marking when the degree of deviation is equal to or greater than the first threshold value, and the number of edge points is equal to or greater than a second threshold value.

2. The complex marking determining device according to claim 1, wherein:

the electronic control unit is further configured to calculate, as the lane marking representative value, a median value of brightness values of the plurality pixels that make up the lane marking display region, and calculate, as the road surface representative value, a median value of brightness values of the plurality of pixels that make up the road surface display region.

3. The complex marking determining device according to claim 1, wherein:

the electronic control unit is further configured to calculate, as the lane marking representative value, an average value of brightness values of the plurality pixels that make up the lane marking display region, and calculate, as the road surface representative value, an average value of brightness values of the plurality of pixels that make up the road surface display region.

4. The complex marking determining device according to claim 1, wherein:

the degree of deviation is a difference between the lane marking representative value and the road surface representative value.

5. The complex marking determining device according to claim 1, wherein:

the degree of deviation is a ratio of the lane marking representative value and the road surface representative value.

6. A complex marking determining method comprising:

capturing an image of a traveling road of a vehicle, and obtaining a traveling road image;

setting a lane marking display region in a position where a lane marking is displayed, in the traveling road image, and setting a road surface display region in a position that is closer to a center of the traveling road than the lane marking display region, and where a road surface other than the lane marking is displayed, in the traveling road image;

calculating a lane marking representative value indicative of a brightness state of a plurality of pixels that make up the lane marking display region, and calculating a road surface representative value indicative of a brightness state of a plurality of pixels that make up the road surface display region;

determining that the lane marking is a complex marking when a degree of deviation between the lane marking representative value and the road surface representative value is equal to or greater than a preset threshold value;

detecting a number of edge points in the lane marking display region; and determining that the lane marking is a complex marking when the degree of deviation is equal to or greater than the first threshold value, and the number of edge points is equal to or greater than a second threshold value.

\* \* \* \* \*